United States Patent
Nelson et al.

(10) Patent No.: US 11,524,242 B2
(45) Date of Patent: Dec. 13, 2022

(54) SYSTEMS AND METHODS FOR PROVIDING CUSTOMIZED INSTANCES OF A GAME WITHIN A VIRTUAL SPACE

(71) Applicant: DISNEY ENTERPRISES, INC., Burbank, CA (US)

(72) Inventors: Robert Nelson, Burbank, CA (US); Robert Lowe, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 810 days.

(21) Appl. No.: 15/002,038

(22) Filed: Jan. 20, 2016

(65) Prior Publication Data

US 2017/0203205 A1    Jul. 20, 2017

(51) Int. Cl.
*A63F 13/79* (2014.01)
*A63F 13/60* (2014.01)

(52) U.S. Cl.
CPC .............. *A63F 13/79* (2014.09); *A63F 13/60* (2014.09)

(58) Field of Classification Search
CPC ................................. A63F 13/79; A63F 13/60
See application file for complete search history.

(56) References Cited

U.S. PATENT DOCUMENTS

| | | |
|---|---|---|
| 1,004,331 A | 9/1911 | Wright |
| 1,004,624 A | 10/1911 | Brann |
| 5,299,291 A | 3/1994 | Ruetz |
| 5,766,077 A | 6/1998 | Hongo |
| 6,007,338 A | 12/1999 | Dinunzio |
| 6,053,815 A | 4/2000 | Hara |
| 6,200,138 B1 | 3/2001 | Ando |
| 6,691,032 B1 | 2/2004 | Irish |
| 7,081,033 B1 | 7/2006 | Mawle |
| 7,266,847 B2 | 9/2007 | Pauker |
| 7,739,371 B2 | 6/2010 | Ikegaya |

(Continued)

FOREIGN PATENT DOCUMENTS

| | | |
|---|---|---|
| IN | 1381KOL2007 | 4/2009 |
| JP | 2019065430 | 4/2019 |

(Continued)

OTHER PUBLICATIONS

Google search "Iphone Figurine" (Year: 2020), 1 page.

(Continued)

*Primary Examiner* — Thomas H Henry
(74) *Attorney, Agent, or Firm* — Esplin & Associates, PC

(57) ABSTRACT

A system and method for providing customized instances of a game within a virtual space. The system may be configured to obtain values associated with one or more users of the virtual space. The game, which is playable within the virtual space, may initially comprise predefined features and initially undefined features. The customizations may define the initially undefined features to provide custom-defined features. As such, when played, the game may include the predefined features and the custom-defined features. Customizations defining the initially undefined features to provide custom-defined features for a given instance of the game may be determined based on the values associated with a given user. The system may be configured to provide the given instance of the game to the given user.

22 Claims, 2 Drawing Sheets

(56) References Cited

U.S. PATENT DOCUMENTS

| | | |
|---|---|---|
| 7,837,544 B2 | 11/2010 | Tipping |
| 8,078,163 B2 | 12/2011 | Lemond |
| 8,190,295 B1 | 5/2012 | Garretson |
| 8,758,126 B2 | 6/2014 | Bavitz |
| 8,831,228 B1 | 9/2014 | Agrawal |
| 8,882,595 B2 | 11/2014 | Chowdhary |
| 8,894,462 B2 | 11/2014 | Leyland |
| 8,941,690 B2 | 1/2015 | Seder |
| 8,948,541 B2 | 2/2015 | Neville |
| 8,988,465 B2 | 3/2015 | Baron |
| 9,007,400 B2 | 4/2015 | Takahashi |
| 9,008,310 B2 | 4/2015 | Nelson |
| 9,266,018 B2 | 2/2016 | Story |
| 9,293,042 B1 | 3/2016 | Wasserman |
| 9,327,189 B2 | 5/2016 | Bavitz |
| 9,361,730 B2 | 6/2016 | Keating |
| 9,467,515 B1 | 10/2016 | Penilla |
| 9,610,510 B2 | 4/2017 | Comploi |
| 9,643,086 B2 | 5/2017 | Tipping |
| 9,669,302 B2 | 6/2017 | Park |
| 9,715,764 B2 | 7/2017 | Alaniz |
| 9,744,448 B2 | 8/2017 | Mullen |
| 9,814,991 B2 | 11/2017 | Van Winkle |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,045,147 B2 | 8/2018 | Dickow |
| 10,059,347 B2 | 8/2018 | Thieberger-Navon |
| 10,123,155 B2 | 11/2018 | Grover |
| 10,140,464 B2 | 11/2018 | Lebeck |
| 10,162,998 B2 | 12/2018 | Park |
| 10,186,065 B2 | 1/2019 | Anderson |
| 10,310,600 B2 | 6/2019 | Hong |
| 10,339,711 B2 | 7/2019 | Ng-Thow-Hing |
| 10,366,290 B2 | 7/2019 | Wang |
| 10,376,776 B2 | 8/2019 | Lowe |
| 10,482,669 B2 | 11/2019 | Rober |
| 10,501,053 B2 | 12/2019 | Tokunaga |
| 10,506,092 B1 | 12/2019 | Stephenson |
| 10,572,123 B2 | 2/2020 | Penilla |
| 10,585,471 B2 | 3/2020 | Reichow |
| 10,589,625 B1 | 3/2020 | Goslin |
| 10,639,557 B2 | 5/2020 | Hake |
| 10,785,621 B1 | 9/2020 | Drake |
| 11,251,978 B2 | 2/2022 | Ingraham |
| 2003/0027636 A1 | 2/2003 | Covannon |
| 2003/0104824 A1 | 6/2003 | Hale |
| 2003/0130031 A1 | 7/2003 | Yoshida |
| 2004/0059922 A1 | 3/2004 | Harris |
| 2005/0021192 A1 | 1/2005 | Takafuji |
| 2005/0059483 A1 | 3/2005 | Borge |
| 2006/0052153 A1 | 3/2006 | Vlazny |
| 2006/0224456 A1 | 10/2006 | Walker |
| 2006/0277100 A1 | 12/2006 | Parham |
| 2007/0060233 A1* | 3/2007 | Liccardo .................. A63F 13/12 463/8 |
| 2007/0087834 A1 | 4/2007 | Moser |
| 2007/0093299 A1 | 4/2007 | Bergeron |
| 2007/0139671 A1 | 6/2007 | Stevens |
| 2007/0197275 A1 | 8/2007 | Gagner |
| 2007/0206023 A1* | 9/2007 | Street ...................... A63F 13/10 345/582 |
| 2008/0105751 A1 | 5/2008 | Landau |
| 2008/0148067 A1 | 6/2008 | Sitrick |
| 2008/0200244 A1 | 8/2008 | Rowe |
| 2008/0309010 A1 | 12/2008 | Bowling |
| 2008/0311983 A1 | 12/2008 | Koempel |
| 2009/0069084 A1 | 3/2009 | Reece |
| 2009/0079705 A1 | 3/2009 | Sizelove |
| 2009/0137323 A1 | 5/2009 | Fiegener |
| 2009/0176566 A1* | 7/2009 | Kelly ...................... G07F 17/32 463/29 |
| 2009/0313358 A1 | 12/2009 | Shepherd |
| 2010/0033427 A1 | 2/2010 | Marks |
| 2010/0093421 A1* | 4/2010 | Nyman ................ G06Q 20/108 463/17 |
| 2010/0098092 A1 | 4/2010 | Luo |
| 2010/0130296 A1 | 5/2010 | Ackley |
| 2010/0182340 A1 | 7/2010 | Bachelder |
| 2010/0324984 A1 | 12/2010 | Pelto |
| 2010/0331721 A1 | 12/2010 | Epley |
| 2011/0098092 A1 | 4/2011 | Reiche, III |
| 2011/0183754 A1* | 7/2011 | Alghamdi ............. A63F 13/216 463/31 |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2012/0289122 A1 | 11/2012 | Elliott |
| 2012/0295703 A1 | 11/2012 | Reiche |
| 2012/0295704 A1 | 11/2012 | Reiche |
| 2013/0030645 A1 | 1/2013 | Divine |
| 2013/0083003 A1 | 4/2013 | Perez |
| 2013/0083061 A1 | 4/2013 | Mishra |
| 2013/0157607 A1 | 6/2013 | Paek |
| 2013/0166147 A1 | 6/2013 | Chudzinski |
| 2013/0274024 A1 | 10/2013 | Geylik |
| 2013/0296058 A1 | 11/2013 | Leyland |
| 2014/0067208 A1 | 3/2014 | Klappert |
| 2014/0100020 A1 | 4/2014 | Carroll |
| 2014/0100029 A1 | 4/2014 | Reiche |
| 2014/0128144 A1 | 5/2014 | Bavitz |
| 2014/0128145 A1 | 5/2014 | Hwang |
| 2014/0162785 A1 | 6/2014 | Reiche |
| 2014/0163771 A1 | 6/2014 | Demeniuk |
| 2014/0201004 A1 | 7/2014 | Parundekar |
| 2014/0274313 A1 | 9/2014 | Bala |
| 2014/0295963 A1 | 10/2014 | Ishikawa |
| 2014/0342790 A1 | 11/2014 | Kim |
| 2015/0003609 A1 | 1/2015 | Nelson |
| 2015/0024852 A1 | 1/2015 | Pacey |
| 2015/0065237 A1 | 3/2015 | Hohn |
| 2015/0080125 A1 | 3/2015 | Andre |
| 2015/0097860 A1 | 4/2015 | Alaniz |
| 2015/0097864 A1 | 4/2015 | Alaniz |
| 2015/0100179 A1 | 4/2015 | Alaniz |
| 2015/0145671 A1 | 5/2015 | Cohen |
| 2015/0174479 A1 | 6/2015 | Reiche |
| 2015/0202962 A1 | 7/2015 | Habashima |
| 2015/0269780 A1 | 9/2015 | Herman |
| 2015/0294505 A1 | 10/2015 | Atsmon |
| 2015/0346722 A1 | 12/2015 | Herz |
| 2016/0005070 A1 | 1/2016 | Burr |
| 2016/0042607 A1 | 2/2016 | Mccoy |
| 2016/0071397 A1 | 3/2016 | Logan |
| 2016/0096114 A1 | 4/2016 | Van Winkle |
| 2016/0189444 A1 | 6/2016 | Madhok |
| 2016/0199730 A1 | 7/2016 | Olson |
| 2016/0206955 A1 | 7/2016 | Goslin |
| 2016/0206957 A1 | 7/2016 | Goslin |
| 2016/0299567 A1 | 10/2016 | Crisler |
| 2016/0310839 A1 | 10/2016 | Leyland |
| 2016/0313792 A1 | 10/2016 | Siegel |
| 2016/0346704 A1 | 12/2016 | Wagner |
| 2017/0021273 A1 | 1/2017 | Rios |
| 2017/0021282 A1 | 1/2017 | Comploi |
| 2017/0045946 A1 | 2/2017 | Smoot |
| 2017/0050743 A1 | 2/2017 | Cole |
| 2017/0068311 A1 | 3/2017 | Evans |
| 2017/0072316 A1 | 3/2017 | Finfter |
| 2017/0078621 A1 | 3/2017 | Sahay |
| 2017/0103571 A1 | 4/2017 | Beaurepaire |
| 2017/0106288 A1 | 4/2017 | Reiche |
| 2017/0132334 A1 | 5/2017 | Levinson |
| 2017/0166221 A1 | 6/2017 | Osterman |
| 2017/0236328 A1 | 8/2017 | Eatedali |
| 2017/0270502 A1 | 9/2017 | Finbow |
| 2017/0330034 A1 | 11/2017 | Wang |
| 2017/0352185 A1 | 12/2017 | Bonilla Acevedo |
| 2018/0008894 A1 | 1/2018 | Sack |
| 2018/0011988 A1 | 1/2018 | Ziegler |
| 2018/0040162 A1 | 2/2018 | Donnelly |

(56) References Cited

U.S. PATENT DOCUMENTS

| | | |
|---|---|---|
| 2018/0040163 A1 | 2/2018 | Donnelly |
| 2018/0043272 A1 | 2/2018 | Van Winkle |
| 2018/0089900 A1 | 3/2018 | Rober |
| 2018/0089901 A1 | 3/2018 | Rober |
| 2018/0096501 A1 | 4/2018 | Anderson |
| 2018/0181412 A1 | 6/2018 | Paratey |
| 2018/0231973 A1 | 8/2018 | Mattingly |
| 2018/0342001 A1 | 11/2018 | Chavarria |
| 2018/0369702 A1 | 12/2018 | Hake |
| 2019/0001987 A1 | 1/2019 | Kim |
| 2019/0047498 A1 | 2/2019 | Alcaidinho |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1 | 5/2019 | Kim |
| 2019/0220674 A1 | 7/2019 | Khalfan |
| 2020/0053400 A1 | 2/2020 | Chao |
| 2020/0074181 A1 | 3/2020 | Chang |
| 2020/0163616 A1 | 5/2020 | Sakaya |
| 2020/0193163 A1 | 6/2020 | Chang |
| 2021/0016184 A1 | 1/2021 | Kalama |
| 2021/0217026 A1 | 7/2021 | Hassani |
| 2021/0256070 A1 | 8/2021 | Bao |
| 2021/0284088 A1 | 9/2021 | Yamaguchi |
| 2022/0004600 A1 | 1/2022 | Bangole |

FOREIGN PATENT DOCUMENTS

| | | |
|---|---|---|
| WO | 2007101785 A1 | 9/2007 |
| WO | 2018128946 A1 | 7/2018 |

OTHER PUBLICATIONS

NPX "Software-Apple-Carplay: Software Technology for CarPlay", https://www.nxp.com/design/software/embedded-software/software-technology-for-carplay:Software-Apple-Carplay (Year: 2020), 3 pages.

"Battle Circuit", Capcom, available at «https://web.archive.org/web/20000111 073021 /http://www.capcom.co.jp/newproducts/arcade/battle/bs-top. html» (Orig in al Japanese web page followed by English translation), 4 pages.

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hac king [retrieved on Nov. 12, 2014] (8 pgs).

"Video Game/ Battle Circuit", TV Tropes, available at «https://web.archive.org/web/20150114005112/http://tvtropes.org/pmwiki/pmwiki .php/VideoGameBattleCircuit» (4 pages).

Adam Hartley, 5 Predictions for the Future of in-Car Entertainment, Apr. 9, 2019 [https://360.here.com/5-predictions-for-the-future-of-in-car-leisure-entertainme nt], (5 pages).

Dagamant, 'Skylanders Hacking', Retrieved from the Internet http://web.archive.ora/web/20120309212642/http://www,suncries.com/skvlaners-hack ing Feb. 27, 2012, XP055152538, 8 pages.

Extended European Search Report issued in European Patent Application No. 14175300.4, dated Nov. 19, 2014. (6 pgs).

Kloster, Benjamin, 'Wanted: Encryption Scheme for Copy Protection Purposes', Retrieved from the Internet http://stackoverflow.com/questions/14529732/wanted-encrYption-scheme-for-copy-pr otection-purposes, Jan. 25, 2013, XP055152568, 2 pages.

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competi tive-advantage.html], (5 pages).

Apple (Developing Wireless CarPlay System, https://developer.apple.com/videos/play/wwdc2017/717/WWDC 2017, video and slide). (Year: 2017).

Holoride, "Adding Thrill to Every Ride" Conceptual Litepaper V.2.1; https://maiarlaunchpad.com/holoride_Litepaper_V2.1_Nov21.pdf; Nov. 2021 (26 pages).

IBM Institute for Business Value, "Blockchain for mobility services" https://www.ibm.com/downloads/cas/M8AOGADZ ; Jan. 2018 (8 pages).

https://maiarlaunchpad.com/holoride_Litepaper_V2.1_Nov21.pdf, pp. 1-26.

https://www.ibm.com/downloads/cas/M8AOGADZ, 2018, pp. 1-8.

* cited by examiner

SYSTEMS AND METHODS FOR PROVIDING CUSTOMIZED INSTANCES OF A GAME WITHIN A VIRTUAL SPACE

FIELD OF THE DISCLOSURE

This disclosure relates to providing customized instances of a game within a virtual space.

BACKGROUND

Typically, missions or games presented to users within an open world are pre-determined. For example, the mission or game is the same irrespective of the user interacting with the open world. Furthermore, customization of a game is typically limited to modifications of visual aspects of the game and/or characters associated with the game rather than a customized gaming experience. For example, modifications to the game may be made in response to actions performed by a character in the game. As another example, a user may select customizations from an in-game menu providing available customization options.

SUMMARY

One aspect of the disclosure relates to a system configured for providing customized instances of a game within a virtual space. Customized instances of the game may provide users with a custom gaming experience within a virtual space. The users may be provided with a customized instance of the game while interacting with the virtual space. The users may not have to quit or exit the virtual space to play the customized instance of the game. The virtual space may include an open world and/or virtual world where incentives and/or objectives are not strictly defined. The gaming experience may include the way the user perceives, interacts with, and/or plays the game such that the customized instance of the game provided within the virtual space may be different for different users.

The customized instances may include customizations that are determined based on values associated with one or more users. The system may obtain values associated with one or more users of the virtual space. The values associated with different users may be different. The system may determine customizations of a game that may be playable within the virtual space. The game may initially comprise predefined features and initially undefined features. The customizations may define the initially undefined features to provide custom-defined features. When played, the game may include the predefined features and the custom-defined features. The customizations defining the initially undefined features may provide custom-defined features for a given customized instance of the game. Given customizations for a given customized instance of the game may be determined based on a given value associated with a given user.

In some implementations, the system may include one or more servers. The server(s) may be configured to communicate with one or more client computing platforms according to a client/server architecture. In some implementations, the client computing platform(s) may communicate with other client computing platform(s) according to a peer-to-peer architecture. The users may access the system via client computing platform(s), for instance to view and/or interact with the virtual space and/or game space.

The server(s) may be configured to execute machine-readable instructions to provide customized instances of a game within a virtual space. The machine-readable instructions may include one or more of a virtual space component, a user component, a value component, a customization component, a game component, an adaptation component, and/or other components.

The value component may be configured to obtain values associated with one or more users of the virtual space. The values may include one or more of a first value associated with a first user, a second value associated with a second user, and/or other values associated with other users. The first value may be different from the second value. In some implementations, the values may correspond to one or more of a biometric sample of a user, a user identification, a user profile attribute, a pseudorandom number generated using an individualized seed, and/or other values.

The customization component may be configured to determine customizations of a first game that may be playable within the virtual space. The first game may initially comprise predefined features, initially undefined features, and/or other features. The customizations may define the initially undefined features to provide custom-defined features. As such, when played, the first game may include the predefined features, the custom-defined features, and/or other features. In some implementations, customizations may define the initially undefined features to provide custom-defined features for a first instance of the first game.

The custom-defined features for the first instance of the first game may be determined based on the first value. Customizations may define the initially undefined features to provide custom-defined features for a second instance of the first game. The custom-defined features for the second instance of the first game may be determined based on the second value. The first instance of the first game may be different than the second instance of the first game. The difference may be due to the first value being different from the second value. The initially undefined features may include one or more of a game space parameter, a game type, a game rule, a game objective, a game event, a game storyline, a game reward, a game theme, and/or other features of a game.

In some implementations, the customization component may be configured to determine the one or more customizations defining the initially undefined features from a set of potential features. As such, the custom-defined features provided may include one or more interchangeable features from the set of potential features.

In some implementations, the custom-defined features may be adaptable during gameplay. The adaptation component may be configured to adapt one or more custom-defined features of the first instance of the first game. One or more custom-defined features of the first instance of the first game may be adapted based on the gameplay of the first user in the first instance of the first game. The adaptation component may be configured to adapt one or more custom-defined features of the second instance of the first game. One or more custom-defined features of the second instance of the first game may be adapted based on the gameplay of the second user in the first instance of the first game.

The game component may be configured to provide the first game to users within the virtual space. The first instance of the first game may be provided to the first user. The second instance of the first game may be provided to the second user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
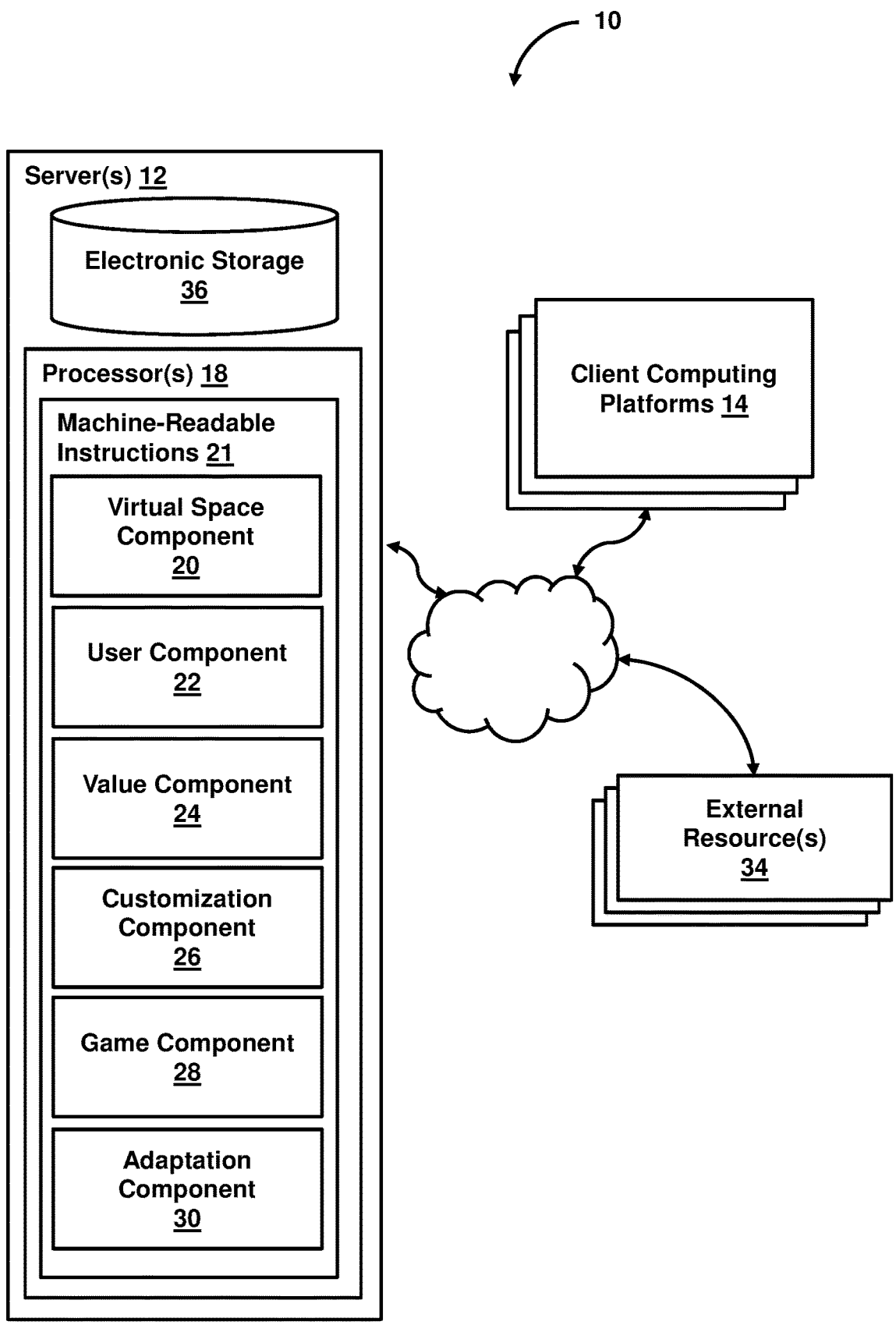
FIG. 1 illustrates a system configured to provide customized instances of a game within a virtual space, in accordance with one or more implementations.

FIG. 1 illustrates a system 10 configured to provide customized instances of a game within a virtual space, in accordance with one or more implementations. System 10 may be configured to obtain values associated with one or more users of the virtual space. The values may include a first value associated with a first user and/or a second value associated with a second user. The first value may be different from the second value. System 10 may determine customizations of a first game that may be playable within the virtual space. The first game may initially comprise predefined features, initially undefined features, and/or other features. The customizations may define the initially undefined features to provide custom-defined features. As such, when played, the first game may include the predefined features, the custom-defined features, and/or other features. In some implementations, customizations defining the initially undefined features to provide custom-defined features for a first instance of the first game may be determined based on the first value. Customizations defining the initially undefined features to provide custom-defined features for a second instance of the first game may be determined based on the second value. The first instance of the first game may be different than the second instance of the first game. The difference may be due to the first value being different from the second value. System 10 may be configured to provide to users the first game within the virtual space. The first instance of the first game may be provided to the first user. The second instance of the first game may be provided to the second user.

System 10 may include one or more server(s) 12. In some implementations, server(s) 10 may be configured to communicate with one or more client computing platforms (e.g., client computing platforms 14) according to a client/server architecture. In some implementations, client computing platform(s) 14 may communicate with other client computing platform(s) 14 according to a peer-to-peer architecture. The users may access system 10 via client computing platform(s) 14, for instance to view and/or interact with the virtual space and/or game space.

The server(s) 12 may be configured to execute machine-readable instructions 21. The machine-readable instructions 21 may include one or more of a virtual space component 20, a user component 22, a value component 24, a customization component 26, a game component 28, an adaptation component 30, and/or other components.

Virtual space component 20 may be configured to provide a virtual space to one or more users. In some implementations, the virtual space may include an open world and/or or virtual world. An open world and/or virtual world may include a virtual space design where a user character can roam somewhat freely and where incentives and/or objectives are not strictly defined. Providing the virtual space may include hosting the virtual space over a network. In some implementations, virtual space component 20 may be configured to communicate with one or more client computing platforms 14 according to a client/server architecture. The users may access the virtual space via client computing platforms 14.

The virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a two-dimensional topography. In other instances, the topography may be a three-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The virtual space executed by the computer components may be synchronous, asynchronous, and/or semi-synchronous.

The description herein of the manner in which views of the virtual space are provided is not intended to be limiting. The virtual space may be expressed in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the virtual space and/or instance(s) of the virtual space, users may control characters, objects, simulated physical phenomena (e.g., wind, rain, earthquakes, and/or other phenomena), and/or other elements to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., virtual resources and/or virtual items) that the user can use (e.g., by manipulation of a user character or other user-controlled element, and/or other items) to perform in-game actions within the virtual space.

The users may participate in virtual space by controlling one or more of the available user-controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12. In some implementations, game component 28 may be configured to implement the delivery of the limited-time event to users in connection with in-game implementation as described herein.

The virtual space and/or the instance of the virtual space may be persistent. That is, the virtual space and/or the instance of the virtual space may continue on whether or not individual users are currently logged in and/or participating in the virtual space. A user that logs out of the virtual space and then logs back in some time later may find the virtual space has been changed through the interactions of other users with the virtual space during the time the user was logged out. These changes may include changes to the simulated physical space, changes in the user's inventory, changes in other users' inventories, changes experienced by non-user characters, and/or other changes.

User component 22 may be configured to store information associated with one or more users of the virtual space. Information associated with one or more users of the virtual space may include information identifying users (e.g., a username, a user number, an identifier, and/or other identifying information), security login information (e.g., a login code or password), values associated with the users, account information, user preferences, user behavior, user interactions, user selections, user history, and/or other user information. In some implementations, user component 22 may be configured to store information associated with one or more users of the virtual space in a profile associated with the one or more users.

Value component 24 may be configured to obtain values associated with one or more users of the virtual space. The values may include one or more of a first value associated with a first user, a second value associated with a second user, and/or other values associated with other users. The first value may be different from the second value. In some implementations, the values may correspond to one or more of a biometric sample of a user, a user identification, a user profile attribute, a pseudorandom number generated using an individualized seed, and/or other values. Value component 24 may communicate with user component 22 and/or other components to obtain values associated with one or more users of the virtual space. In some implementations, the values may be stored in one or more user profiles corresponding to the users of the virtual space.

In some implementations, the values may correspond to a biometric sample of a user. The biometric sample may be a measurement and/or representation of one or more biological features of a user. The one or more biological features of a user may include one or more of a fingerprint, a face, a voice, a hand, a palm, an eye, an odor, DNA (deoxyribonucleic acid), and/or other biological features. In some implementations, one or more values may be derived from one or more biometric samples associated with users of the virtual space. By way of non-limiting example, the values may be derived from a given biometric sample by determining multiple biometric points on a scan of the biometric feature of a user, taking measurements between the biometric points, compiling the measurements to obtain a value derived from the biometric sample, and/or by other steps and/or methods.

In some implementations, values may correspond to a user identification. A user identification may include one or more of a username, a user number, a user code, an IP address, a user birth date, a user social security number, a user age, a user location, and/or other user identifications. For example, the first value associated with the first user may include the first user's user number and the second value associated with the second user may include the IP address of a client computing platform associated with the second user. In some implementations, the first value and the second value may include the same user identification associated with the individual users. For example, the first value may include the first user's birth date and the second value may include the second user's birth date.

In some implementations, the values may correspond to a user profile attribute. The user profile attribute may include one or more of a user preference, a user behavior, user interactions, a user selection, user history, and/or other user profile attributes. A user preference may describe a user's inclination or liking with respect to one or more aspects of the virtual space, a game within the virtual space, and/or other user preferences. User interactions may describe a user's interactions with one or more of the virtual space, characters within the virtual space, the game within the virtual space (e.g., the first game), characters within the game, and/or other user interactions. A user selection may include one or more user settings or options chosen by the user for one or more of the virtual space, the game within the virtual space, user profile, and/or other virtual spaces and/or games in which the user has participated. A user history may describe a user's past encounters, experiences, and/or outcomes with one or more of the virtual space, the game within the virtual space, and/or other games and/or virtual spaces in which the user has participated. By way of non-limiting example, a user profile attribute for the first user may include a user character (e.g., Buzz Lightyear) selected by the first user in a previous game played by the first user using the profile login for a user profile associated with the first user. Continuing the example, the value associated with a user that selected Buzz Lightyear and/or other character may be a value corresponding to Buzz Lightyear and/or other character in a lookup table and/or other specification.

In some implementations, the values may correspond to a pseudorandom number generated using an individualized seed. In some implementations, an individualized seed may include one or more of the values corresponding to the biometric sample of a user, the user identification, the user profile attribute, and/or other individualized value. The pseudorandom number may include one or more numbers in a sequence of numbers that appear random but are produced by a definite mathematical procedure (e.g., an algorithm). The pseudorandom number may be generated using the individualized seed in a pseudorandom number generator (e.g., an algorithm).

Customization component 26 may be configured to determine customizations of a first game that may be playable within the virtual space. The first game may be playable within the virtual space such that a user may not have to quit or exit the virtual space to play the first game. The user character previously interacting with the virtual space may interact with game space while playing the first game. In some implementations, interaction with the game space (e.g., playing the first game) may be temporary and the user character may return to the virtual space upon termination of the first game. The user character's return to the virtual space from the game space may occur responsive to the user completing, withdrawing from, quitting, exiting, and/or otherwise terminating the first game. In some implementations, the user character and/or aspects of the user character may be different in the virtual space than in the game space.

The first game may initially comprise predefined features, initially undefined features, and/or other features. The customizations may define the initially undefined features to provide custom-defined features. As such, when played, the first game may include the predefined features, the custom-defined features, and/or other features. In some implementations, customizations may define the initially undefined features to provide custom-defined features for a first instance of the first game. The custom-defined features for the first instance of the first game may be determined based on the first value. Customizations may define the initially undefined features to provide custom-defined features for a second instance of the first game. The custom-defined features for the second instance of the first game may be determined based on the second value. The first instance of the first game may be different than the second instance of the first game. The difference may be due to the first value being different from the second value.

The initially undefined features may include one or more of a game space parameter, a game type, a game rule, a game objective, a game event, a game storyline, a game reward, a game theme, and/or other feature of a game. In some implementations, the initially undefined features may include one or more game space parameters. The game space parameters may describe one or more of a visual appearance, auditory characteristic, behavior of, and/or other characteristics of one or both of a game space associated with the first game or a character within the game space associated with the first game. A visual appearance may describe how aspects of the game space and/or a character within the game space look to a user. For example, an initially undefined feature may include the visual setting of the game space such that the custom-defined feature may include a desert setting.

An auditory characteristic may include the sounds associated with one or more aspects of the game space and/or a character within the game space. By way of non-limiting example, an initially undefined feature may include the background music of the game space such that the custom-defined feature may include the sound track from Toy Story. A behavior may describe the way the game space and/or a character within the game space respond, function, perform, and/or act within the instance of the game. For example, an initially undefined feature may include the weather in the game space such that the custom-defined feature may include rain. By way of another non-limiting example, an initially undefined feature may include the movement of a character in the game space such that the custom-defined feature may include running at a fast pace.

In some implementations, the initially undefined features may include one or more game types. The game types may describe one or more of a game genre, a game sub-genre, a graphical perspective, a game flow, and/or other characteristics of the game type. A game genre may include one or more of an action game, a survival game, an action-adventure game, an adventure game, a role-playing game, a simulation game, a strategy game, and/or other game genre and/or combinations of genres. A game sub-genre may include one or more sub-genres within a game genre. For example, a sub-genre of an action game may include one or more of a fighting game, a shooter game, a platform game, a real-time strategy game, a rhythm game, and/or other action games. By way of non-limiting example, two initially undefined features may include the genre and the sub-genre such that the corresponding custom-defined features may include a simulation game and a sports-simulation game.

A user-perspective may include the perspective view of the game seen by the user such as first-person perspective, third-person perspective, side-scrolling perspective, top-down perspective, and/or other user perspectives. For example, an initially undefined feature may include the user-perspective such that the custom-defined feature may include a side-scrolling game. A game flow may describe how time passes in the game, for example, a real-time game, a turn-based game, variations of a real-time and/or turn-based game, and/or other game flows. For example, an initially undefined feature may include the game-flow such that the custom-defined feature may include a turn-based game.

In some implementations, the initially undefined features may include one or more game rules. The game rules may describe mechanics and/or methods that define and/or limit participation, actions, and/or interactions within the first game of user characters, non-user characters, game elements, and/or users. By way of non-limiting example, an initially undefined feature may include the number of players able to participate in a game such that the custom-defined feature may include a single player game. By way of another non-limiting example, an initially undefined feature may include the length of the game such that the custom-defined feature may include a three minute game.

In some implementations, the initially undefined features may include one or more game objectives. The game objectives may be a purpose or goal that efforts or actions within the first game are intended to attain or accomplish. For example, an initially undefined feature may include the goal of the game such that the custom-defined feature may include defending a star field. In some implementations, the initially undefined features may include one or more game events. The game events may be one or more occurrences of something that happens involving and/or relevant to a user character and/or a non-user character within the first game. By way of non-limiting example, an initially undefined feature may include an event that happens relevant to the user character such that the custom-defined feature may include an earthquake that leaves debris blocking the path of the user character.

In some implementations, the initially undefined features may include a game storyline. The game storyline may describe a plot associated with the first game. By way of non-limiting example, an initially undefined feature may include a plot of the game such that the custom-defined feature may include a princess has been kidnapped and is being held hostage on a pirate ship. In some implementations, the initially undefined features may include one or more game rewards. The game rewards may include things provided to a user and/or a user character based on their efforts, actions, and/or accomplishments within the first game. The game reward may be provided within the first game and/or within the virtual space in which the first game may be playable. For example, an initially undefined feature may include a reward for performing actions within the game such that the custom-defined feature may include gold stars.

In some implementations, the initially undefined features may include a game theme. The game theme may be a unifying subject associated with the customized instance of the first game. The game theme may affect one or more attributes of the game and/or the game space associated with the game. For example, the game theme may affect one or more characters, game space characteristics, objects, designs, symbols, color schemes, music, and/or other attributes of the game and/or game space associated with the game. By way of non-limiting example, an initially undefined feature may include a game theme such that the custom-defined feature may include a Frozen theme.

In some implementations, customization component 26 may be configured to determine the one or more customizations defining the initially undefined features from a set of potential features. As such, the custom-defined features provided may include one or more interchangeable features from the set of potential features. Various potential features may be stored in electronic storage 36, other storage accessible to customization component, and/or in other locations. In some implementations, the set of potential features may be included in a lookup table and/or other specification. The lookup table and/or other specification may include one or more values and/or ranges of values that correspond to a given potential feature. The customizations may be based on the value obtained by value component 24 corresponding with one or more values and/or ranges of values in the lookup table and/or other specification.

In some implementations, customization component 26 may be configured to determine customizations to the first game based on the interactions of the user within the virtual space in which the first game may be playable. By way of non-limiting example, if a user character spends a significant amount of time interacting with other user characters within the virtual space, one or more customizations may include a game rule dictating that the first game is a multiple-player game. In some implementations, customization component 26 may be configured to determine customizations of multiple instances of multiple games that are playable within the virtual space.

In some implementations, the custom-defined features may be adaptable during gameplay. System 10 may include an adaptation component 30. Adaptation component 30 may be configured to adapt one or more custom-defined features of the first instance of the first game. One or more custom-defined features of the first instance of the first game may be adapted based on the gameplay of the first user in the first instance of the first game. In some implementations, adaptation component 30 may be configured to adapt one or more custom-defined features of the second instance of the first game. One or more custom-defined features of the second instance of the first game may be adapted based on the gameplay of the second user in the first instance of the first game. Adapting one or more custom-defined features may include changing the custom-defined features to include different custom-defined features. The gameplay of a given user may describe the way the user interacts with one or both of the game space and/or characters within the game space. By way of non-limiting example, responsive to the gameplay style of first user within the first instance of the first game being aggressive, one or more custom-defined features may be adapted. As such, continuing the example, a custom defined objective of rescuing a captured princess may be adapted to include avenging the capturers in battle.

Game component 28 may be configured to provide games within the virtual space. The first instance of the first game may be provided to the first user. The second instance of the first game may be provided to the second user. In some implementations, more than two customized instances of the game may be determined and presented to corresponding users. In some implementations, game component 28 may be configured to provide customized instances of multiple games that are playable within the virtual space.

Game component 28 may be configured to execute the customized instance of the first game. The customized instance of the first game may facilitate user participation in the first game by executing actions in the customized instance of the first game. Actions may be executed in the instance of the first game in response to user commands received from client computing platforms (e.g., client computing platforms 14) associated with the users. For example, actions may be executed in the first instance of the first game in response to user commands of the first user received from a client computing platform associated with the first user. Continuing the example, actions may be executed in the second instance of the first game in response to user commands of the second user received from a client computing platform associated with the second user.

The customized instance of the first game may be provided via a game space, and may be executed by computer components to determine game state information for the game and/or the game space. The game state information may then be communicated from server(s) 12 and/or sources to client computing platforms 14 for presentation to users. For example, client computing platforms 14 may implement game state information to present and/or update views of the game and/or the game space. The view determined for presentation at a given client computing platform 14 may correspond to a location in the game space (e.g., the location from which the view is taken, the location the view depicts, and/or other locations), a zoom ratio, a dimensionality of objects, a point-of-view, and/or view parameters. One or more of the view parameters may be selectable by the user.

The instance of the game space may comprise a simulated space that is accessible by users via clients (e.g., client computing platform(s) 14) that present the views of the game space to a user. The simulated space may have a topography, express ongoing real-time interaction by one or more users, and/or include one or more objects positioned within the topography that are capable of locomotion within the topography. In some instances, the topography may be a two-dimensional topography. In other instances, the topography may be a three-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The description herein of the manner in which views of the game space are provided is not intended to be limiting. The game space may be expressed in a more limited, or richer, manner. For example, views determined for the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space, users may control characters, objects, simulated physical phenomena (e.g., wind, rain, earthquakes, and/or other phenomena), and/or other elements to interact with the game space and/or each other. The user characters may include avatars. As used herein, the term "user character" may refer to an object (or group of objects) present in the game space that corresponds to an individual user. The user character may be controlled by the user with which it is associated.

User-controlled element(s) may move through and interact with the game space (e.g., non-user characters in the game space, other objects in the game space). The user-controlled elements controlled by and/or associated with a given user may be created and/or customized by the given user. The user may have an "inventory" of virtual goods and/or currency (e.g., virtual resources and/or virtual items) that the user can use (e.g., by manipulation of a user character or other user-controlled element, and/or other items) to perform in-game actions within the game space.

The users may participate in the instance of the game space by controlling one or more of the available user-controlled elements in the game space. Control may be exercised through control inputs and/or commands input by the users through client computing platforms 14. The users may interact with each other through communications exchanged within the game space. Such communications may include one or more of textual chat, instant messages, private messages, voice communications, and/or other communications. Communications may be received and entered by the users via their respective client computing platforms 14. Communications may be routed to and from the appropriate users through server(s) 12. In some implementations, game component 22 may be configured to implement the delivery of the limited-time event to users in connection with in-game implementation as described herein.

The instance of the game space and/or the customized instance of the first game may be persistent. That is, the game space and/or the first game may continue on whether or not individual users are currently logged in and/or participating in the first game. A user that logs out of the first game and then logs back in some time later may find the game space associated with the first game has been changed through the interactions of other users with the game space during the time the user was logged out. These changes may include changes to the simulated physical space, changes in the user's inventory, changes in other users' inventories, changes experienced by non-user characters, and/or other changes.

In some implementations, two or more components of system 10 (e.g., server(s) 12, client computing platform(s) 14, and/or external resource(s) 34) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 10 may be operatively linked via some other communication media.

A given client computing platform 14 may include one or more processors configured to execute computer program components. The computer program components may be configured to enable an expert or user associated with the given client computing platform 14 to interface with system 10 and/or external resources 34 and/or provide other functionality attributed herein to client computing platform(s) 14. By way of non-limiting example, the given client computing platform 14 may include one or more of a desktop computer, a laptop computer, a handheld computer, a NetBook, a Smartphone, a gaming console, and/or other computing platforms.

The external resources 34 may include sources of information, hosts and/or providers of virtual environments outside of system 10, external entities participating with system 10, and/or other resources. In some implementations, some or all of the functionality attributed herein to external resources 34 may be provided by resources included in system 10.

The server(s) 12 may include electronic storage 36, one or more processors 18, and/or other components. The server(s) 12 may include communication lines, or ports to enable the exchange of information with a network and/or other computing platforms. Illustration of server(s) 12 in FIG. 1 is not intended to be limiting. The server(s) 12 may include a plurality of hardware, software, and/or firmware components operating together to provide the functionality attributed herein to server(s) 12. For example, server(s) 12 may be implemented by a cloud of computing platforms operating together as server(s) 12.

Electronic storage 36 may comprise electronic storage media that electronically stores information. The electronic storage media of electronic storage 36 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 36 may include one or more virtual storage resources (e.g., cloud storage, a virtual private network, and/or other virtual storage resources). Electronic storage 36 may store software algorithms, information determined by processor(s) 18, information received from one or more other components of system 10, and/or other information that enables server(s) 12 to function as described herein.

The processor(s) 18 may be configured to provide information processing capabilities in server(s) 12. As such, processor(s) 18 may include one or more of a digital processor, an analog processor, digital circuit designed to process information, an analog circuit designed to process information, a state machine, and/or other mechanisms for electronically processing information. Although processor(s) 18 is shown in FIG. 1 as a single entity, this is for illustrative purposes only. In some implementations, processor(s) 18 may include a plurality of processing units. These processing units may be physically located within the same device, or processor(s) 18 may represent processing functionality of a plurality of devices operating in coordination. The processor(s) 18 may be configured to execute machine-readable instruction components 20, 22, 24, 26, 28, 30, and/or other components. The processor(s) 18 may be configured to execute components 20, 22, 24, 26, 28, 30, and/or other components by software; hardware; firmware; some combination of software, hardware, and/or firmware; and/or other mechanisms for configuring processing capabilities on processor(s) 18.

It should be appreciated that although components 20, 22, 24, 26, 28, and 30 are illustrated in FIG. 1 as being co-located within a single processing unit, in implementations in which processor(s) 18 includes multiple processing units, one or more of components 20, 22, 24, 26, 28, and 30 may be located remotely from the other components. The description of the functionality provided by the different components 20, 22, 24, 26, 28, and 30 described herein is for illustrative purposes, and is not intended to be limiting, as any of components 20, 22, 24, 26, 28, and 30 may provide more or less functionality than is described. For example, one or more of components 20, 22, 24, 26, 28, and 30 may be eliminated, and some or all of its functionality may be provided by other ones of components 20, 22, 24, 26, 28, and 30. As another example, processor(s) 18 may be configured to execute one or more additional components that may perform some or all of the functionality attributed herein to one of components 20, 22, 24, 26, 28, and 30.

Figure 2:
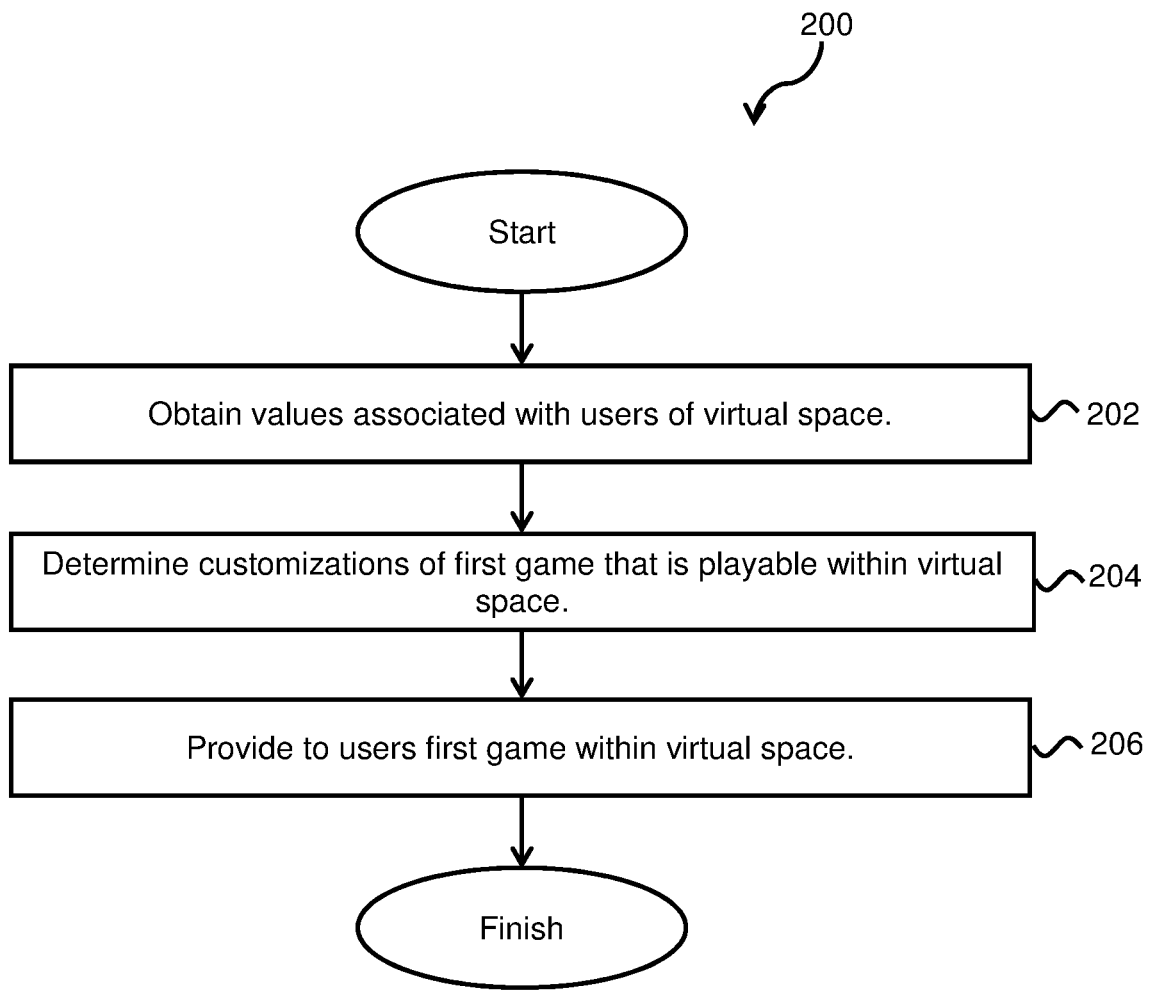
FIG. 2 illustrates a method for providing customized instances of a game within a virtual space, in accordance with one or more implementations.

FIG. 2 illustrates a method 200 for providing customized instances of a game within a virtual space, in accordance with one or more implementations. The operations of method 200 presented herein are intended to be illustrative. In some embodiments, method 200 may be accomplished with one or more additional operations not described, and/or without one or more of the operations discussed. Additionally, the order in which the operations of method 200 are respectively illustrated in FIG. 2 and described herein is not intended to be limiting.

In some embodiments, method 200 may be implemented in one or more processing devices. One or more processing devices may include, for example, one or more of a digital processor, an analog processor, a digital circuit designed to process information, an analog circuit designed to process information, a state machine, and/or other mechanisms for electronically processing information. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, values associated with one or more users of the virtual space may be obtained. The values may include a first value associated with a first user. The values may include a second value associated with a second user. The first value may be different from the second value. Operation 202 may be performed by one or more processors configured to execute a value component that is the same as or similar to value component 24, in accordance with one or more implementations.

At an operation 204, customizations of a first game may be determined. The first game may be playable within the virtual space. The first game may initially comprise predefined features, initially undefined features, and/or other features. The customizations may define the initially undefined features to provide custom-defined features. When played, the first game may include the predefined features, the custom-defined features, and/or other features. The customizations defining the initially undefined features to provide custom-defined features for a first instance of the first game may be determined based on the first value. Customizations defining the initially undefined features to provide custom-defined features for a second instance of the first game may be determined based on the second value. The first instance of the first game may be different than the second instance of the first game due to the first value being different from the second value. Operation 204 may be performed by one or more processors configured to execute a customization component that is the same as or similar to customization component 26, in accordance with one or more implementations.

At an operation 206, the first game may be provided to users within the virtual space. The first instance of the first game may be provided to the first user. The second instance of the first game may be provided to the second user. Operation 206 may be performed by one or more processors configured to execute a game component that is the same as or similar to game component 28, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide customized instances of a game within a virtual space, the system comprising:
one or more physical computer processors configured by machine-readable instructions to:
obtain one or more biometric samples from one or more users of the virtual space, a first biometric sample being obtained from a first user and a second biometric sample being obtained from a second user;
derive values for the one or more users of the virtual space from the one or more biometric samples, the values including pseudorandom numbers generated using the one or more biometric samples as an individual seed, the values including a first value associated with the first user and a second value associated with the second user, the first value being different from the second value, the first value comprising a first pseudorandom number generated using the first biometric sample as the individual seed, and the second value comprising a second pseudorandom number generated using the second biometric sample as the individual seed;
determine customizations of a first game that is playable within the virtual space based on the values, the first game initially comprising predefined features and initially undefined features, the customizations defining the initially undefined features to provide custom-defined features such that when played the first game includes the predefined features and the custom-defined features, wherein the customizations defining the initially undefined features to provide the custom-defined features for a first instance of the first game are determined based on the first value and the customizations defining the initially undefined features to provide the custom-defined features for a second instance of the first game are determined based on the second value such that the first instance of the first game is different than the second instance of the first game due to the first value being different from the second value; and
provide the first game within the virtual space, the first instance of the first game being provided to the first user and the second instance of the first game being provided to the second user.

2. The system of claim 1, wherein the values are further derived from one or more of a user identification or a user profile attribute.

3. The system of claim 1, wherein the initially undefined features include a game space parameter, the game space parameter describing behavior of a character within the game space associated with the first game.

4. The system of claim 1, wherein the initially undefined features include a game type, the game type describing one or more of a game genre, a graphical perspective, or a game flow, wherein the game genre includes one or more of an action game, a survival game, an action-adventure game, an adventure game, a role-playing game, a simulation game, or a strategy game, the graphical perspective includes one or more of first-person perspective, third-person perspective, side-scrolling perspective, or top-down perspective, and the game flow includes how time passes in the first game.

5. The system of claim 1, wherein the initially undefined features include a game rule, the game rule describing mechanics that define at least one of a number of players able to participate in the first game or a length of the first game.

6. The system of claim 1, wherein the initially undefined features include a game objective, the game objective being a purpose or goal that efforts or actions within the first game are intended to attain or accomplish.

7. The system of claim 1, wherein the initially undefined features include a game event, the game event being an occurrence of something that happens involving or relevant to at least one of a user character or a non-user character within the first game.

8. The system of claim 1, wherein the initially undefined features include a game storyline, the game storyline describing a plot associated with the first game.

9. The system of claim 1, wherein the initially undefined features include a game reward, the game reward including something provided to the first user or a user character based on at least one of their efforts, actions, or accomplishments within the first game, the game reward being provided within at least one of the first game or the virtual space in which the first game is playable.

10. The system of claim 1, wherein the initially undefined features include a game theme, the game theme being a unifying subject associated with a customized instance of the first game.

11. The system of claim 1, wherein the customizations defining the initially undefined features are determined from a set of potential features such that the custom-defined features provided include one or more interchangeable features from the set of potential features.

12. The system of claim 1, wherein determining the customizations to the first instance of the first game is further based on interactions of the first user within the virtual space in which the first instance of the first game is playable.

13. The system of claim 1, wherein the custom-defined features are adaptable during gameplay and the one or more physical computer processors are further configured by machine-readable instructions to:
adapt one or more of the custom-defined features of the first instance of the first game based on the gameplay of the first user in the first instance of the first game; and
adapt one or more of the custom-defined features of the second instance of the first game based on the gameplay of the second user in the second instance of the first game.

14. A method configured to provide customized instances of a game within a virtual pace, the method comprising:

obtaining one or more biometric samples from one or more users of the virtual space, including obtaining a first biometric sample from a first user and a second biometric sample from a second user;
deriving values for the one or more users of the virtual space from the one or more biometric samples, the values including pseudorandom numbers generated using the one or more biometric samples as an individual seed, the values including a first value associated with the first user and a second value associated with the second user, the first value being different from the second value, the first value comprising a first pseudorandom number generated using the first biometric sample as the individual seed, and the second value comprising a second pseudorandom number generated using the second biometric sample as the individual seed;
determining customizations of a first game that is playable within the virtual space based on the values, the first game initially comprising predefined features and initially undefined features, the customizations defining the initially undefined features to provide custom-defined features such that when played the first game includes the predefined features and the custom-defined features, wherein the customizations defining the initially undefined features to provide the custom-defined features for a first instance of the first game are determined based on the first value and the customizations defining the initially undefined features to provide the custom-defined features for a second instance of the first game are determined based on the second value such that the first instance of the first game is different than the second instance of the first game due to the first value being different from the second value; and
providing the first game within the virtual space, the first instance of the first game being provided to the first user and the second instance of the first game being provided to the second user.

15. The method of claim 14, wherein the initially undefined features include a game space parameter, the game space parameter describing behavior of a character within the game space associated with the first game.

16. The method of claim 14, wherein the initially undefined features include a game type, the game type describing one or more of a game genre, a graphical perspective, or a game flow, wherein the game genre includes one or more of an action game, a survival game, an action-adventure game, an adventure game, a role-playing game, a simulation game, or a strategy game, the graphical perspective includes one or more of first-person perspective, third-person perspective, side-scrolling perspective, or top-down perspective, and the game flow includes how time passes in the first game.

17. The method of claim 14, wherein the initially undefined features include a game rule, the game rule describing mechanics that define at least one of a number of players able to participate in the first game or a length of the first game.

18. The method of claim 14, wherein the initially undefined features include a game objective, the game objective being a purpose or goal that efforts or actions within the first game are intended to attain or accomplish.

19. The method of claim 14, wherein the initially undefined features include a game event, the game event being an occurrence of something that happens involving or relevant to at least one of a user character or a non-user character within the first game.

20. The method of claim 14, wherein the initially undefined features include a game storyline, the game storyline describing a plot associated with the first game.

21. The method of claim 14, wherein the initially undefined features include a game reward, the game reward including something provided to the first user or a user character based on at least one of their efforts, actions, or accomplishments within the first game, the game reward being provided within at least one of the first game or the virtual space in which the first game is playable.

22. The method of claim 14, wherein the initially undefined features include a game theme, the game theme being a unifying subject associated with a customized instance of the first game.

* * * * *